(No Model.)
J. G. ACCLES & P. L. RENOUF.
FRONT STEERING FORK FOR BICYCLES.
No. 576,831. Patented Feb. 9, 1897.
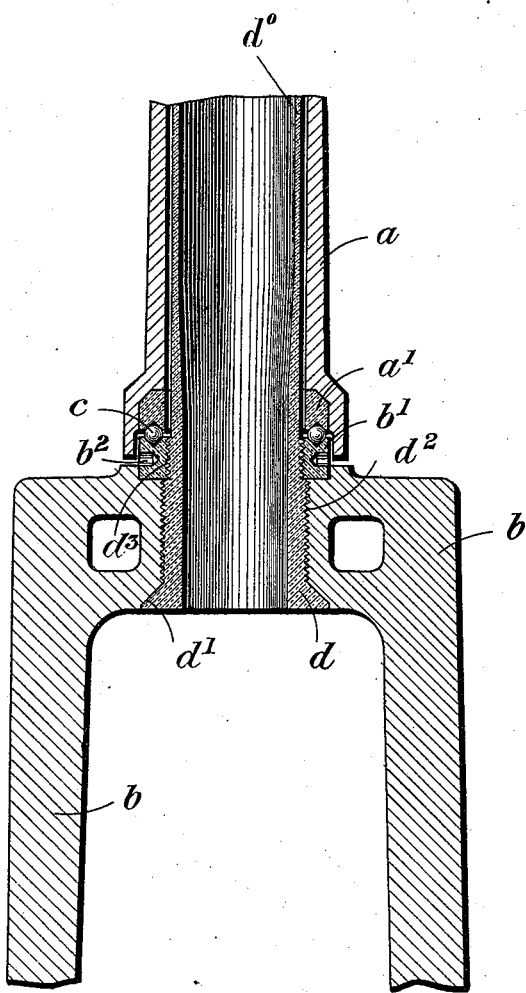

UNITED STATES PATENT OFFICE.

JAMES GEORGE ACCLES AND PHILIP LOUIS RENOUF, OF BIRMINGHAM, ENGLAND.

FRONT STEERING-FORK FOR BICYCLES.

SPECIFICATION forming part of Letters Patent No. 576,831, dated February 9, 1897.

Application filed October 17, 1896. Serial No. 609,212. (No model.)

*To all whom it may concern:*

Be it known that we, JAMES GEORGE ACCLES and PHILIP LOUIS RENOUF, subjects of the Queen of Great Britain, residing at Holford Works, Perry Barr, Birmingham, England, have invented certain new and useful Improvements in Front Steering-Forks for Velocipedes, of which the following is a specification, reference being had to the accompanying drawing.

This invention relates to an improved construction of front steering-forks for velocipedes, and is designed to avoid the difficulties that are experienced in the formation of front forks in one piece by casting or stamping the same, and also to avoid the necessity for brazing the steering-stem to the fork, which in many instances is objectionable—as, for example, when the fork is made of aluminium.

For the purposes of our invention we form the crown of the fork integral with the prongs thereof and we attach the steering-stem to the crown by screwing.

Referring to the accompanying drawing, which illustrates in central longitudial section a portion of a front steering-fork constructed according to our invention and also a part of the frame, $b$ is the fork, consisting of two prongs united by a crown-piece formed integrally therewith. $d^0$ is the steering-stem, secured in the crown of said fork in accordance with our invention, as hereinafter described.

$a$ is a portion of the tubular member of the frame through which the steering-stem passes.

$a'$ $b'$ are bearing-pieces secured to the tubular member $a$ and fork $b$, respectively, and formed with ball-races in which the balls $c$ revolve. The metal of the hollow stem $d^0$ is made of increased thickness at and near the lower end by a lining or otherwise and the stem is furnished with a flange or shoulder $d$ at the end. It is screw-threaded externally, as indicated at $d^2$, and is secured to the fork by being screwed into the crown thereof, which is formed with a suitable screw-threaded hole to receive the said stem. The lower edge of the hole in the crown is chamfered or otherwise formed at $d'$ to receive the shoulder $d$, which is tightly screwed against the crown. The bearing-piece $b'$, forming the lower ball-race for the balls $c$, is screwed onto the stem $d^0$ and serves as a lock-nut to securely lock the stem to the fork. If the screw-threads $d^2$ are right-handed, then we prefer that the screw-threads of the part $d^3$ of the stem on which the nut $b'$ screws be left-handed, or, vice versa, if the screw-threads $d^2$ are left-handed, then those of the nut $b'$ and part $d^3$ are right-handed. $b^2$ are holes in the nut $b'$ to admit of the introduction of a key for turning the nut.

What we claim is—

1. In a velocipede-frame the combination of a front fork and steering-stem, the latter being screwed into the crown of the former, and a lock-nut for locking the stem in position, substantially as described.

2. The combination of a front fork, a steering-stem screwed into the crown of the fork, a flange or shoulder formed on the stem to bear against the crown, and a lock-nut for locking the stem in position, and for forming at the same time a ball-race for the bearing of the front fork, substantially as described.

3. The combination of a front fork having the crown integral with the prongs, and bored and screw-threaded to receive the steering-stem, a hollow steering-stem screw-threaded to fit the hole in the crown of the fork, and made of increased thickness at the part that is screw-threaded, a flange or shoulder at the lower end of the stem to bear against the crown, and a lock-nut to lock the stem in place and to form a ball-race for the bearing of the front fork, substantially as described.

In testimony whereof we have hereunto set our hands this 25th day of September, 1896.

JAMES GEORGE ACCLES.
PHILIP LOUIS RENOUF.

Witnesses:
THOMAS MARSTON,
JOSH. DORRICOTT.